United States Patent
Dayan et al.

(10) Patent No.: US 9,195,947 B2
(45) Date of Patent: *Nov. 24, 2015

(54) AUTO-MAINTAINED DOCUMENT CLASSIFICATION

(71) Applicant: International Business Machines Corporation, Armonk, NY (US)

(72) Inventors: Yigal S. Dayan, Jerusalem (IL); Gil Fuchs, Mevasert Tsiyon (IL); Josemina M. Magdalen, Jerusalem (IL); Irit Maharian, Tzur Hadasa (IL); Yariv Tzaban, Nofit (IL)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/492,914

(22) Filed: Sep. 22, 2014

(65) Prior Publication Data

US 2015/0012470 A1    Jan. 8, 2015

Related U.S. Application Data

(63) Continuation of application No. 13/900,605, filed on May 23, 2013.

(51) Int. Cl.
*G06N 5/04* (2006.01)
*G06K 9/62* (2006.01)
*G06N 99/00* (2010.01)

(52) U.S. Cl.
CPC ............... *G06N 5/04* (2013.01); *G06K 9/6217* (2013.01); *G06K 9/6255* (2013.01); *G06N 99/005* (2013.01)

(58) Field of Classification Search
CPC ........................................................ G06N 5/04
See application file for complete search history.

(56) References Cited

U.S. PATENT DOCUMENTS

| 7,099,855 | B1 | 8/2006 | Nelken |
| 7,756,810 | B2 | 7/2010 | Nelken |
| 7,849,087 | B2 | 12/2010 | Goutte et al. |
| 2008/0071721 | A1 | 3/2008 | Wang et al. |
| 2014/0122410 | A1* | 5/2014 | Ludlow et al. ............ 706/59 |

* cited by examiner

*Primary Examiner* — Alan Chen
(74) *Attorney, Agent, or Firm* — Edell, Shapiro & Finnan, LLC

(57) ABSTRACT

Machines, systems and methods for maintaining a representative data set in a document classification system, the method comprising: including an initial set of seed representative data in a representative data set (RDS) implemented for a knowledge base (KB), wherein the KB is trained to classify documents provided to a document classification system based on analysis of the representative documents included in the RDS and a set of rules, wherein the seed representative data includes a balanced number of representative data across a plurality of classes; updating the RDS by adding or removing representative data from the RDS based on feedback received about accuracy of classification of one or more documents by the classification system; and retraining the KB, wherein the retraining is performed based on occurrence of one or more events.

9 Claims, 4 Drawing Sheets

AUTO-MAINTAINED DOCUMENT CLASSIFICATION

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

CROSS-REFERENCE TO RELATED APPLICATIONS

This application is a continuation of U.S. patent application Ser. No. 13/900,605, entitled "AUTO-MAINTAINED DOCUMENT CLASSIFICATION" and filed May 23, 2013, the disclosure of which is incorporated herein by reference in its entirety.

BACKGROUND

1. Technical Field

The disclosed subject matter relates generally to document classification systems and, more particularly, to maintaining a representative data set in a document classification system.

2. Discussion of the Related Art

A document classification system comprises a knowledge base (KB) that can be trained to classify documents into categories, based on information included in a representative data set (RDS). When a document is to be classified, a statistical analysis of the document is performed and, based on the information in the KB, a classification is determined as the best category match for the target document. The RDS may not contain enough information, or over time its data may become outdated and hence the classification system may not be as accurate as desired, if the data in the RDS is no longer a true representative of the different document classes.

A common practice in example-based classification is to train a KB from scratch at initialization and to also periodically retrain the KB. This practice gives high accuracy but, as mentioned, requires periodic maintenance by a human operator as well as keeping a large set of training documents available. A second common practice is to add incremental feedbacks to an existing KB. This second approach is convenient from the maintenance perspective, but requires great care to avoid bias that degrades the KB.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, machines, systems and methods for maintaining a representative data set in a document classification system are provided. The method may comprise: including an initial set of seed representative data in a representative data set (RDS) implemented for a knowledge base (KB), wherein the KB is trained to classify documents provided to a document classification system based on analysis of the representative documents included in the RDS and a set of rules, wherein the seed representative data includes a balanced number of representative data across a plurality of classes; updating the RDS by adding or removing representative data from the RDS based on feedback received about accuracy of classification of one or more documents by the classification system, and retraining the KB, wherein the retraining is performed based on occurrence of one or more events.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE SEVERAL VIEWS OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
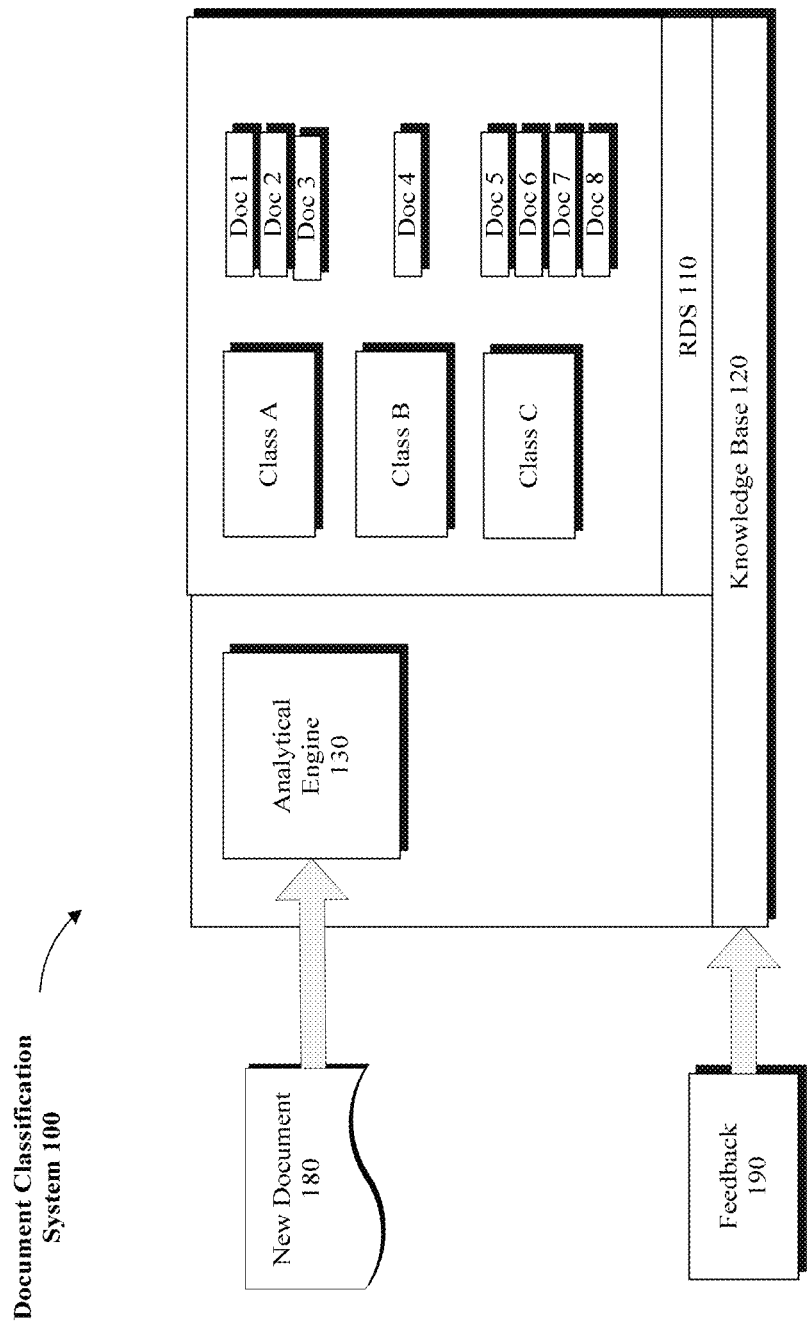
FIG. 1 is a block diagram of an exemplary document classification system in accordance with one embodiment.

Referring to FIG. 1, an exemplary document classification system 100 is illustrated. A knowledge base 120 may include a representative data set (RDS) 110. RDS 110 may include sets of data that are representatives of various document classes. As such, the representative data in the RDS may be used to identify a document class from a plurality of document classes (e.g., classes A, B, C) for a target document. For example, as shown in FIG. 1, docs 1 through 8 may be representatives of documents belonging to different classes, such that representative data for docs 1, 2 and 3 may be associated with class A, representative data for doc 4 may be associated with class B, and representative data for docs 5 through 8 may be associated with class C.

Depending on implementation, an analytical engine 130 may be provided, either as an independent element, or as an integral part of the knowledge base 120. Analytical engine 130 may be trained based on the content of the RDS 110 to classify documents in document classification system 100. When a new document 180 is to be classified, analytical engine 130 analyzes the content of the new document 180 against the content of the representative data in the RDS 110 and, optionally based on a set of rules, classifies the new document 180. In a trivial example shown in FIG. 1, if the content of the new document 180 best matches the representative data for doc 5, for example, then the new document 180 is classified under class C, because doc 5 is associated with class C.

In one embodiment, data in RDS 110 is periodically calibrated to ensure that the representative data for documents representative documents) are properly classified, as the nature of the documents submitted for classification change or based on feedback 190 provided to the classification system 100 by one or more human operators. The feedback 190 may provide information as to the proper classification of certain documents by indicating whether the classification system correctly or incorrectly classified a document according to the knowledge of the human operator. For example, a document may be classified in class A, but feedback 190 may suggest that it would have been more proper for the document to have been classified in class B. If so, then the RDS 110 or rules used by analytical engine 130 may be adjusted to accommodate the provided feedback 190.

Changes in the manner of classification of representative documents and also the number of representative documents in the RDS 110 affect the accuracy level with which the knowledge base 120 classifies new documents. If the RDS is not properly calibrated or maintained, bias may be introduced in the document classification system 100 toward a certain class as the result of provided feedback 190. In other words, bias towards a certain class may result when an uneven amount of feedback is received in favor of a certain class or against a certain class. For example, receiving a lot of feedback for documents classified in class A, as positive, and receiving very few feedbacks for documents classified in class B, as negative, may result in the analytical engine 130 being adjusted to be biased toward classifying more documents in class A, instead of class B.

Figure 2:
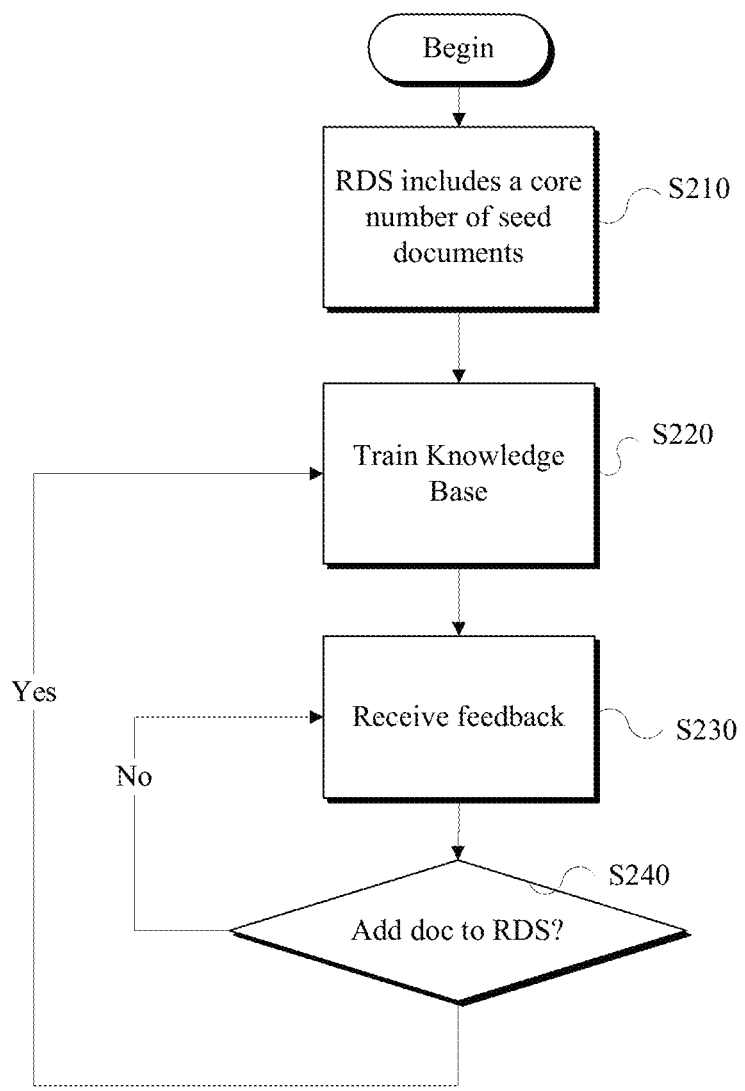
FIG. 2 is a flow diagram of a method of maintaining a document classification system in accordance with one embodiment.

Referring to FIG. 2, to prevent heavy bias, the RDS 110 may be implemented so that the RDS 110 includes a core number of seed representative documents that evenly represent the different classes (S210). For example, the seed may include 5 representative documents for each of the classes A, B and C. As such, in one implementation, a knowledge base 120 may be trained with a number of seed documents in the RDS 110 (S220), even if the training is being done from scratch (e.g., a scenario where the document classification system 100 has not been utilized for commercial use). In this manner, the initial feedback provided by the human operators to the system does not heavily sway in a particular direction, because the seed representative documents previously included in the RDS 110 help soften any bias in the knowledge base 120 that would otherwise occur if the knowledge base 120 was being trained without any seed representative documents. That is, the seed ensures a certain quality even if subsequent feedback is not very accurate.

Feedbacks 190 may be received as document classification system 100 is operational (S230). When new feedback is received, a determination is made whether a new representative document is to be added to the RDS 110 based on the feedback (S240). For example, adding a new representative document to the seed may result in class A having 6 representative documents, where classes B and C remain as having 5 representative documents each. If a representative document is added to RDS 110, the knowledge base 120 may need to be updated or retrained (S220) so that the newly added representative document is taken into account for the purpose of classifying new documents 180. Depending on implementation, an update session or a retraining session may be invoked as soon as the new representative document is added or at a later time.

In one embodiment, it is desirable to invoke a retraining session at a point in time when such retraining is most meaningful. This is because frequent training sessions may result in repeated delays and downtime depending on the number of feedbacks 190 received and the number of representative documents that are added to RDS 110. In other words, constant updating of the RDS 110 and retraining of the analytical engine 130 may not improve the quality of the classification system 100 by a significant level. Therefore, in one embodiment, the updating and retraining processes may be performed as triggered by an event or after a certain time period has passed.

For example, N feedbacks may be provided to document classification system 100 and, as a result, X representative documents may be added to the RDS 110. Depending on implementation, the analytical engine 130 may be retrained, if N is greater than a first threshold. Alternatively, the analytical engine 130 may be retrained if X is greater than a second threshold. Optionally, both thresholds may need to be satisfied before the analytical engine 130 is retrained. As noted above, the retraining of the analytical engine 130 may be based on other threshold settings, such as: (1) after a certain time interval has passed, (2) in the event that a certain number of documents are deleted from the RDS 110, or (3) upon occurrence of other events that may affect the accuracy of the knowledge base 120 or the content of the RDS 110.

In one implementation, to optimize the level of maintenance of the RDS 110, various parameters associated with RDS 110 may be monitored automatically, such as the total number of documents, the size of the classes, or the overall size of the RDS 110, if the sizes of the classes or the RDS 110 exceed respective thresholds, then certain documents may be deleted from the RDS 110. The manner in which the documents are selected for deletion may be based on different factors, such as the age of the documents, the size of the documents, the number of documents in certain classes, the categories in which the documents are classified in, etc.

For example, it may be desirable to have no more than 10 and no less than 5 representative documents in each class. As another example, it may be desirable to keep representative documents that fall in rare categories in the RDS 110, even if such representative data are very old. As such, in one implementation, certain documents may be locked (e.g., identified as preferred or given a higher level of importance) so that the locked documents may not be deleted from the RDS 110. Maintaining rare or hard to get representative documents in the RDS 110 provide for better accuracy in classification and help build the RDS 110 with additional representative documents that fall in the rare category.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 3:
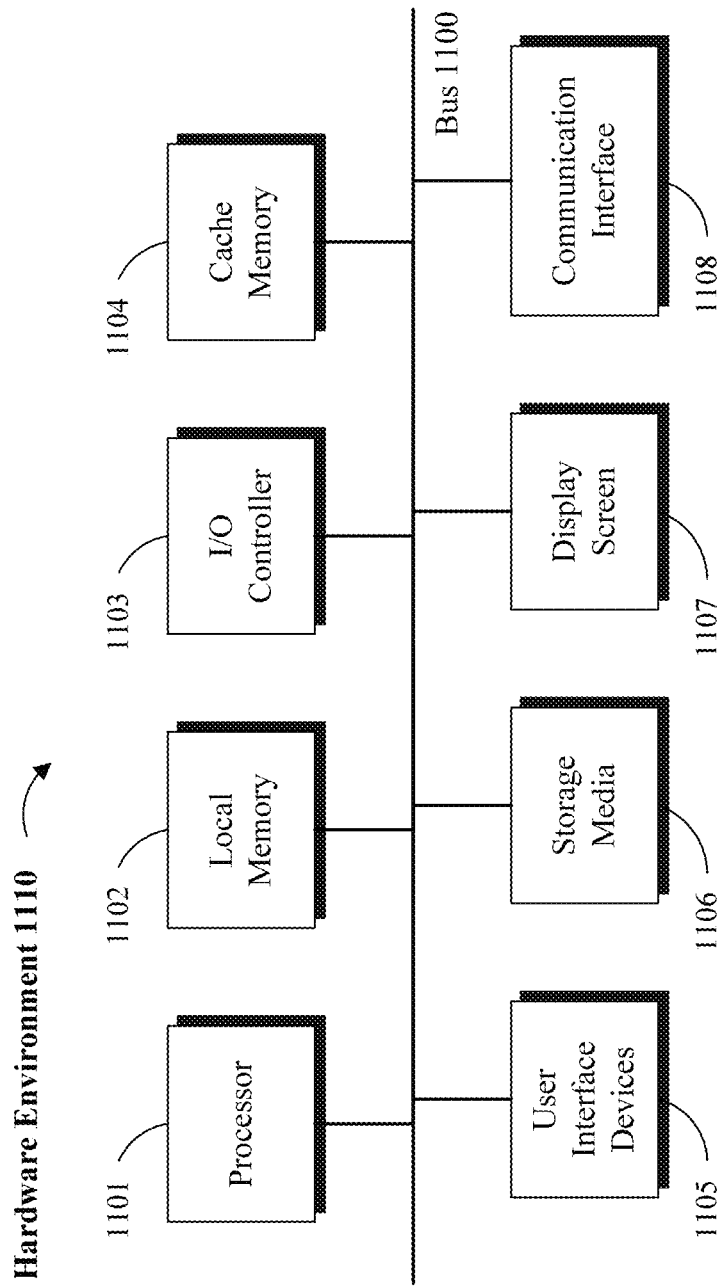
FIGS. 3 and 4 are example block diagrams of hardware and software environments in which the systems and methods disclosed herein may be operational in accordance with one embodiment.
Figure 4:
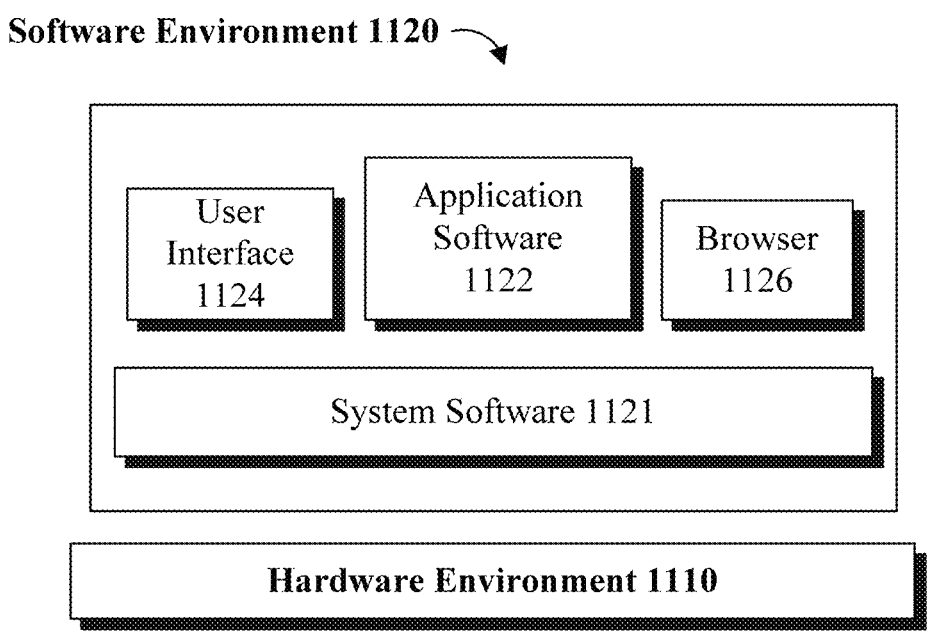

Referring to FIGS. 3 and 4, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 3, the application software and logic code disclosed herein may be implemented in the form of machine readable code executed over one or more computing systems represented by the exemplary hardware environment 1110. As illustrated, hardware environment 1110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor, system, apparatus or device. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (RD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4, software environment 1120 may be generally divided into two classes comprising system software 1121, and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in the form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system," Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein, and is not intended to be limiting of the invention.

As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for maintaining a representative data set in a document classification system, the method comprising:
    including an initial set of seed representative data in a representative data set (RDS) implemented for a knowledge base (KB), wherein the KB is trained to classify documents provided to a document classification system based on analysis of representative documents included in the RDS and a set of rules, wherein the seed representative data includes a balanced number of representative data across a plurality of classes;
    updating the RDS by adding or removing representative data from the RDS based on feedback received about accuracy of classification of one or more documents by the classification system, wherein the representative data is associated with one or more classes in the plurality of classes;
    further updating the RDS such that a number of classes with which the representative data is associated and the number of representative data in each class is adjusted to maintain a balanced inclusion of representative data in each class; and
    retraining the KB, wherein the retraining is performed based on occurrence of one or more events.

2. The method of claim 1 wherein the one or more events comprise passage of a certain period of time.

3. The method of claim 1 wherein the one or more events comprise receiving a certain number of feedbacks.

4. The method of claim 1 wherein the one or more events comprise adopting a certain number of feedbacks by adding or deleting one or more representative data from the RDS.

5. The method of claim 1 wherein the one or more events comprise both receiving N feedbacks and adding at least X representative data to the RDS as a result of receiving the N feedbacks.

6. The method of claim 1, wherein the updating of the RDS is performed, in response to determining that a number of representative data associated with a first class from among said plurality of classes is above a first threshold.

7. The method of claim 1, wherein the updating of the RDS is performed, in response to determining that a number of representative data associated with a first class from among said plurality of classes is below a second threshold.

8. The method of claim 1, wherein the updating of the RDS is performed, in response to determining that a number of representative data in the RDS has exceeded a third threshold.

9. The method of claim 1, wherein the updating of the RDS is performed, in response to determining that a number of representative data in the RDS has fallen below a fourth threshold.

* * * * *